(12) United States Patent
Suyama et al.

(10) Patent No.: US 12,191,643 B2
(45) Date of Patent: Jan. 7, 2025

(54) JOINING STRUCTURE, JOINING METHOD, EXTERIOR BODY FOR WIRE HARNESS, AND WIRE HARNESS

(71) Applicants: FURUKAWA ELECTRIC CO., LTD., Tokyo (JP); FURUKAWA AUTOMOTIVE SYSTEMS INC., Inukami-gun (JP)

(72) Inventors: Hiroshi Suyama, Tokyo (JP); Takashi Oshino, Tokyo (JP); Naoyuki Kojima, Tokyo (JP)

(73) Assignees: FURUKAWA ELECTRIC CO., LTD., Tokyo (JP); FURUKAWA AUTOMOTIVE SYSTEMS INC., Inukami-gun (JP)

(*) Notice: Subject to any disclaimer, the term of this patent is extended or adjusted under 35 U.S.C. 154(b) by 210 days.

(21) Appl. No.: 17/931,643

(22) Filed: Sep. 13, 2022

(65) Prior Publication Data

US 2023/0006430 A1 Jan. 5, 2023

Related U.S. Application Data

(63) Continuation of application No. PCT/JP2021/012555, filed on Mar. 25, 2021.

(30) Foreign Application Priority Data

Mar. 25, 2020 (JP) ................................. 2020-055160

(51) Int. Cl.
*H02G 3/04* (2006.01)
*H01B 3/44* (2006.01)

(52) U.S. Cl.
CPC ............ *H02G 3/0406* (2013.01); *H01B 3/44* (2013.01)

(58) Field of Classification Search
None
See application file for complete search history.

(56) References Cited

U.S. PATENT DOCUMENTS 3,563,822 A    2/1971  Fesh
8,338,697 B2  12/2012  Hoya et al.
(Continued)

FOREIGN PATENT DOCUMENTS

CN    110140269 A     8/2019
JP    61-270138 A    11/1986
(Continued)

OTHER PUBLICATIONS

WO 2020/170559 A1 Translation (Year: 2024).*
(Continued)

*Primary Examiner* — Hoa C Nguyen
*Assistant Examiner* — John B Freal
(74) *Attorney, Agent, or Firm* — Oblon, McClelland, Maier & Neustadt, L.L.P.

(57) ABSTRACT

Provided are a joining structure, a joining method, an exterior body for a wire harness, and a wire harness capable of firmly joining members having different physical properties while reducing the thickness of a joint part. The joining structure 10 joins a first member 1 made of a first resin and a second member 2 made of a second resin, wherein: the second resin has physical properties having a higher foaming ratio than the first resin; and a recessed joint part 3 is provided which reaches at least the inside of the first member 1 from the outer surface side of the second member in a state in which the first member 1 and the second member 2 are superimposed. Furthermore, a method for manufacturing the joining structure 10 comprises the steps of: superimposing a first member 1 made of a first resin and a second member 2 made of a second resin having physical (Continued)

properties having a higher foaming ratio than the first resin; and joining the first member 1 and the second member 2 by forming the recessed joint part 3 by pressing and hot-melting the second member 2 until the recessed joint part 3 reaches at least the inside of the first member 1 from the outer surface side of the second member 2.

20 Claims, 7 Drawing Sheets

(56) References Cited

U.S. PATENT DOCUMENTS

| | | |
|---|---|---|
| 2006/0054268 A1 | 3/2006 | Pacione et al. |
| 2013/0011596 A1 | 1/2013 | Hoya et al. |
| 2013/0011649 A1 | 1/2013 | Hoya et al. |
| 2013/0017351 A1 | 1/2013 | Hoya et al. |
| 2013/0017379 A1 | 1/2013 | Hoya et al. |
| 2016/0060407 A1 | 3/2016 | Hoya et al. |
| 2016/0060443 A1 | 3/2016 | Hoya et al. |
| 2016/0122492 A1 | 5/2016 | Hoya et al. |
| 2020/0027628 A1 | 1/2020 | Ikeda et al. |

FOREIGN PATENT DOCUMENTS

| | | | | |
|---|---|---|---|---|
| JP | 62-227725 A | | 10/1987 | |
| JP | 06210753 A | * | 8/1994 | ........... B29C 44/445 |
| JP | 10-216962 A | | 8/1998 | |
| JP | 3068533 U | | 5/2000 | |
| JP | 2006-272709 A | | 10/2006 | |
| WO | WO 2020/012988 A1 | | 1/2020 | |
| WO | WO-2020170559 A1 | * | 8/2020 | ......... B60R 16/0215 |

OTHER PUBLICATIONS

JP 06-210753 A Translation (Year: 2024).*
International Search Report issued Jun. 1, 2021 in PCT/JP2021/012555, filed on Mar. 25, 2021, 2 pages.
Combined Chinese Office Action and Search Report issued on Jul. 7, 2023 in Chinese Application No. 202180020163.4 (with unedited computer-generated English translation), 13 pages.
Extended European Search Report issued on Jun. 23, 2023 in European Patent application No. 21776247.5, 8 pages.

* cited by examiner

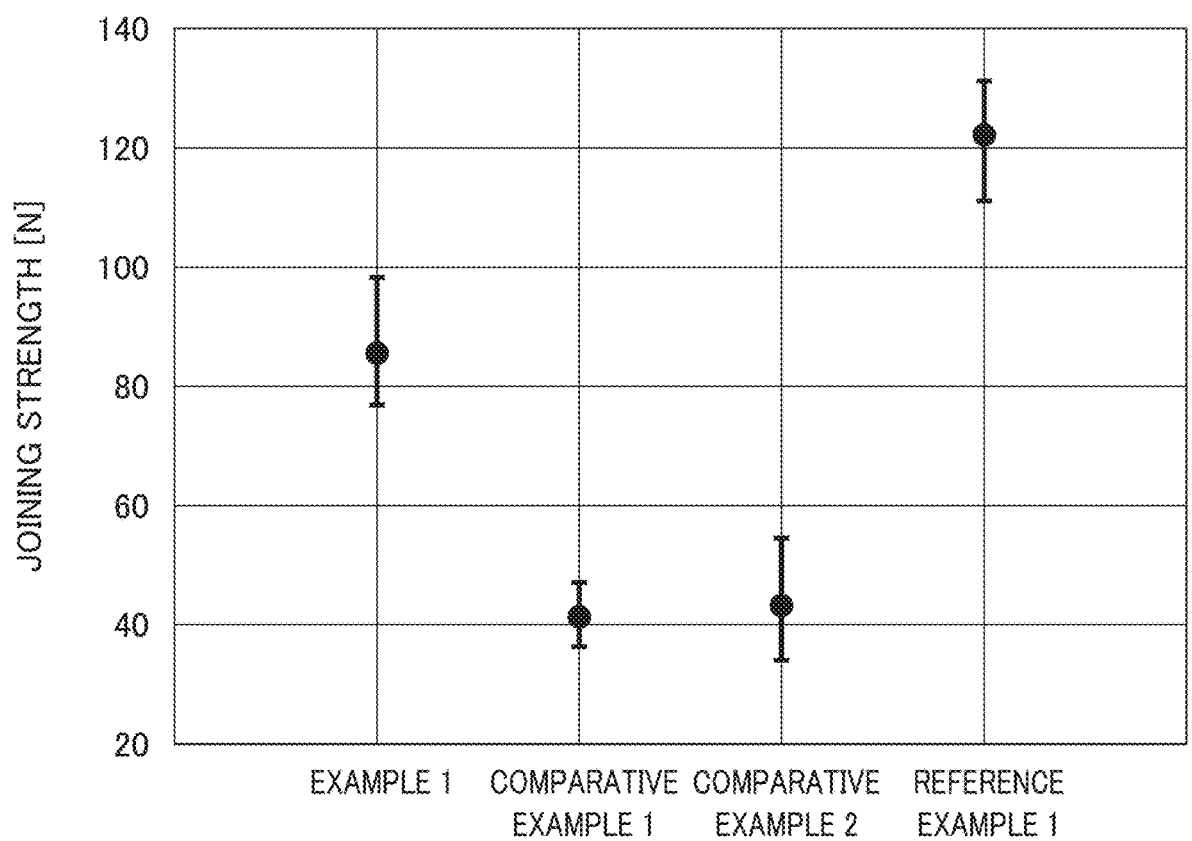

JOINING STRUCTURE, JOINING METHOD, EXTERIOR BODY FOR WIRE HARNESS, AND WIRE HARNESS

TECHNICAL FIELD

The present invention relates to a joining structure, a joining method, a wire harness sheath, and a wire harness.

BACKGROUND ART

Protectors for wire harness (wire harness sheaths) are used in order to protect a wire harness, to regulate a path for a wire harness, and to fasten a wire harness, for example. Protectors for wire harness of various shapes and various materials are used in accordance with applications or the like.

Recently, foamed sheaths made of foamed sheets have received attention. The foamed sheaths have an advantage that they are lightweight and can be produced by cutting a single foamed sheet into a desired shape.

The foamed sheaths are used in various manners, and can be used not only alone, but also in combination with another part. In particular, when the foamed sheath is used in combination with various parts made of different materials, the parts are joined and fixed to each other.

Resin materials can be joined to each other by a method including providing a mating mechanism to the resin materials and mating the resin materials to each other. For example, Patent Document 1 discloses a method of joining two members to each other, according to which one member is provided with a boss having a protruding end while the other is provided with a hole through which the boss is insertable, and the two members are joined to each other by inserting the boss into the hole. This method of providing a mating mechanism to resin materials is applicable also to a case where a part made of a non-foamed material is to be attached to the foamed sheath described above.

Patent Document 1: Japanese Registered Utility Model No. 3068533

DISCLOSURE OF THE INVENTION

Problems to be Solved by the Invention

However, as mentioned above, the structure for fixing resin parts disclosed in Patent Document 1 requires processing to form one member and the other member in advance, and also gives rise to the problem that the joining portion between the two members is large in size. To join two members having different physical properties, it is conceivable to use an adhesive or a double-sided tape. However, depending on the structures and materials of the members, a resultant joining strength may be insufficient to allow the joining portion to be unjoined.

The present invention has been achieved in view of the above circumstance, and it is an object of the present invention to provide a joining structure, a joining method, a wire harness sheath, and a wire harness that are capable of firmly joining members having different physical properties to each other, while making the joining portion thinner.

Means for Solving the Problems

The present inventors have conducted studies to achieve the above-described object. As a result of the studies, the present inventors have made the findings that a joining structure with which two different members (first and second members) having different physical properties are firmly joined to each other can be attained by employing the first member constituted by a first resin and the second member constituted by a second resin having, as a physical property, a higher foaming ratio than the first resin, and by forming, in the joining structure, a recessed joining portion that extends from an outer surface of the second member and reaches at least an interior of the first member in a state in which the first member and second member are overlapped on each other. Furthermore, the present inventors have made the findings that the above-described joining structure can be easily produced by a production method including: overlapping a first member constituted by a first resin and a second member constituted by a second resin on each other, the second resin having, as a physical property, a higher foaming ratio than the first resin; and joining the first member and the second member to each other by forming a recessed joining portion, the recessed joining portion being formed by pressing and hot-melting the second member such that a resultant molten portion extends from an outer surface of the second member and reaches at least an interior of the first member. Based on the foregoing findings, the present inventors have achieved the present invention. More specifically, the present invention provides the following.

(1) A joining structure including:
a first member constituted by a first resin; and
a second member constituted by a second resin,
the first member and the second member being joined to each other, wherein
the second resin has, as a physical property, a higher foaming ratio than the first resin, and
the joining structure has a recessed joining portion that extends from an outer surface of the second member and reaches at least an interior of the first member in a state in which the first member and second member are overlapped on each other.

(2) The joining structure according to (1) above, wherein the second resin is a foamed resin, and the first resin is non-foamed resin.

(3) The joining structure according to (1) or (2) above, wherein the second resin is constituted by a material having a lower melting point than the first resin.

(4) The joining structure according to (1), (2) or (3) above, wherein the second resin is constituted by a material having a lower density than the first resin.

(5) The joining structure according to any one of (1) to (4) above, wherein a joining surface between the first member and the second member has a hot-molten portion spreading outward in a ring shape.

(6) The joining structure according to (5) above, wherein the hot-molten portion has a ring width dimension of 0.5 mm or larger.

(7) A wire harness sheath including the joining structure according to any one of (1) to (6) above (8) A sheathed wire harness including: a wire harness; and the wire harness sheath according to (7) above, wherein the wire harness sheath protects the wire harness by externally surrounding the wire harness or by being provided along a part of an outer periphery of the wire harness.

(9) A joining method including: overlapping a first member constituted by a first resin and a second member constituted by a second resin on each other, the second resin having, as a physical property, a higher foaming ratio than the first resin; and
joining the first member and the second member to each other by forming a recessed joining portion, the recessed joining portion being formed by pressing and hot-melting the second member such that a resultant molten portion extends from an outer surface of the second member and reaches at least an interior of the first member.

(10) The joining method according to (9) above, wherein the pressing and hot-melting the second member is performed using ultrasonic vibration and an applied pressure according to an ultrasonic welding method.

(11) The joining method according to (10) above, wherein the ultrasonic welding method is performed using a welding horn having a projection at a tip thereof such that the projection is thrusted against the outer surface of the second member.

Effects of the Invention

The present invention makes it possible to firmly join members having different physical properties to each other, while making the joining portion thinner.

BRIEF DESCRIPTION OF THE DRAWINGS

FIG. 6 is a distribution chart of joining strengths of joining structure samples of Example 1, Comparative Examples 1 and 2, and Reference Example 1;

PREFERRED MODE FOR CARRYING OUT THE INVENTION

Figure 1:
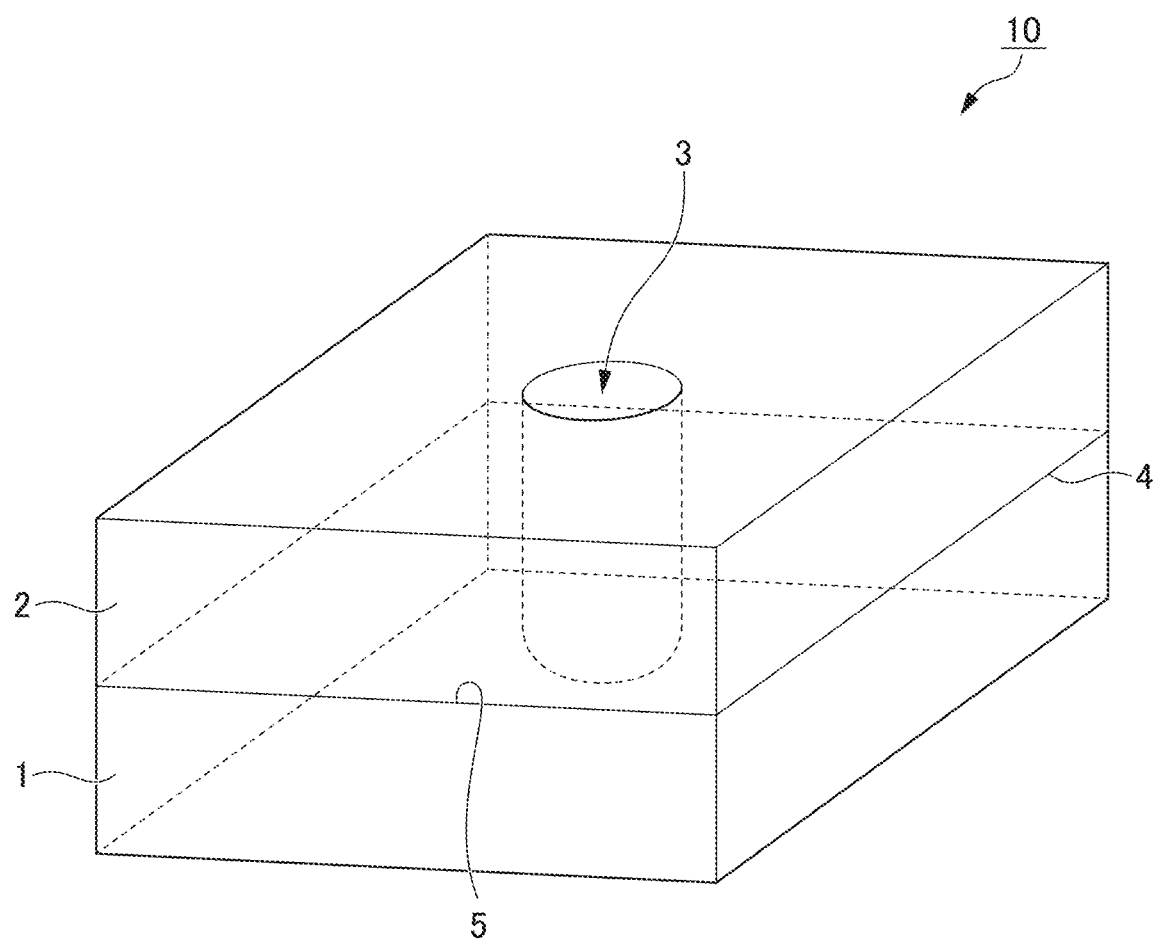
FIG. 1 is a schematic perspective view of a joining structure according to an embodiment of the present invention.

Preferred embodiments of the present invention will be described below in detail. Note the present invention is not limited to the following embodiments.
1 Joining Structure A joining structure of the present embodiment will be described with reference to the drawings. FIG. 1 is a schematic perspective view of the joining structure according to the present embodiment.

The joining structure 10 of the present embodiment joins a first member 1 constituted by a first resin to a second member 2 constituted by a second resin. The second resin has, as a physical property thereof, a higher foaming ratio than the first resin. In a state in which the first member 1 and the second member 2 are overlapped on each other, the joining structure 10 has a recessed joining portion 3 that extends from an outer surface of the second member 2 and reaches at least an interior of the first member 1.

Here, the "foaming ratio" indicates a degree of foaming in each of the first member and the second member. More specifically, the foaming ratio is a value calculated by dividing a density of a member before foaming by an apparent density of the member after foaming.

It has been found that due to the recessed joining portion 3 extending from the outer surface of the second member 2, which has the physical property leading to a higher foaming ratio, and reaching at least the interior of the first member 1, which has the physical property leading to a lower foaming ratio, the joining structure 10 has about twice as a high joining strength as a joining structure including first and second members disposed in inverse order (and thus, having a recessed joining portion extending from an outer surface of the first member and reaching at least an interior of the second member). Furthermore, the recessed joining portion 3 eliminates the need for forming a complicated structure such as a mating structure for joining, and thus can make the joining portion thinner.

Figure 2:
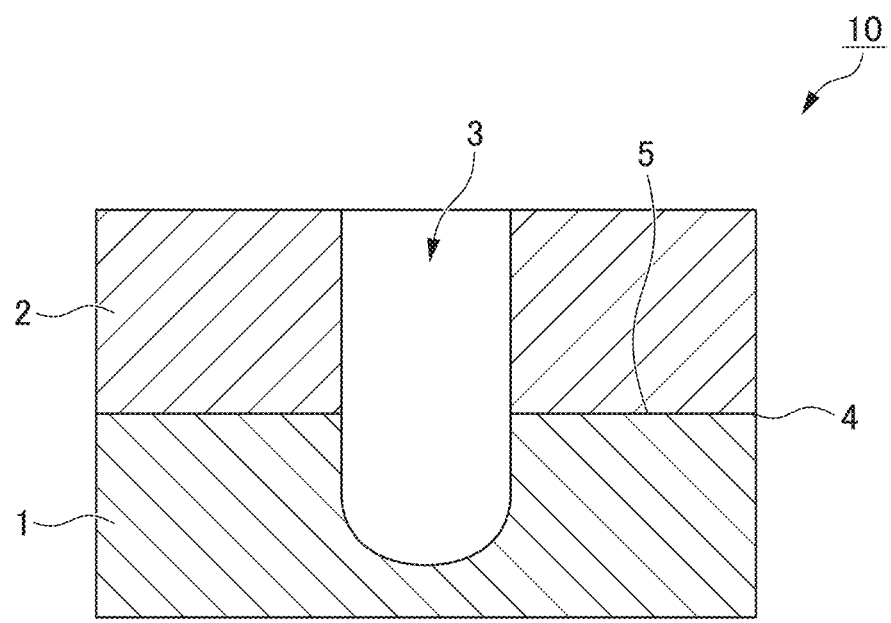
FIG. 2 is a schematic diagram illustrating a cross section of the joining structure according to the embodiment and including a recessed joining portion.
Figure 3:
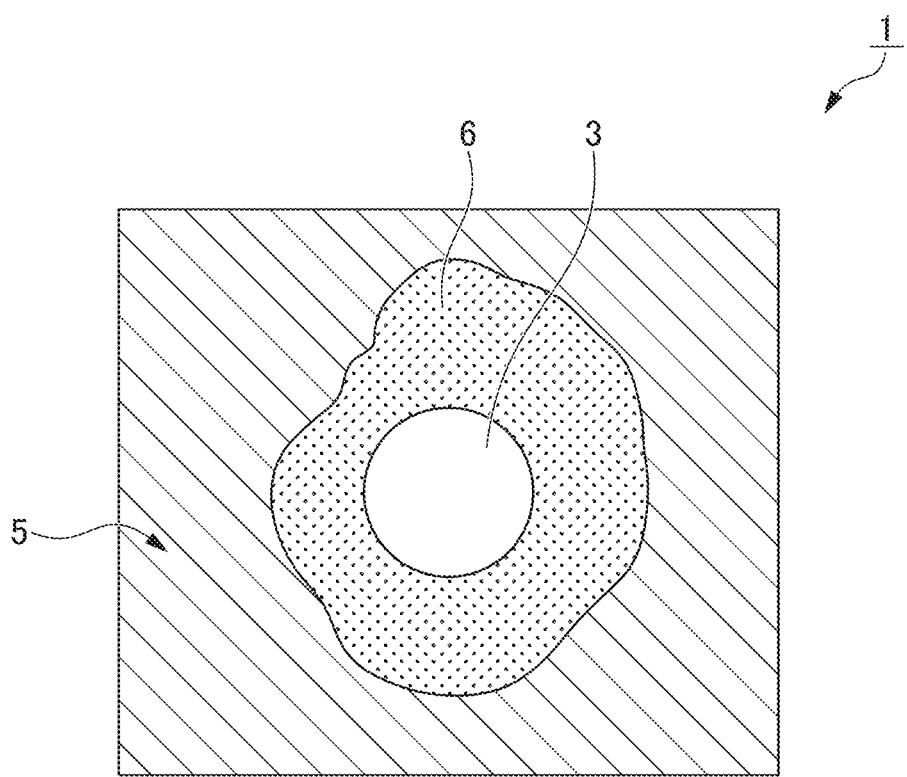
FIG. 3 is a schematic plan view of a joining surface between a first member and a second member that constitute the joining structure of the embodiment, in a state in which the first member and the second member have been separated from each other at a joining interface position.

FIG. 2 is a schematic diagram illustrating a cross section of the joining structure 10 according to the present embodiment and including the recessed joining portion 3. FIG. 3 is a schematic plan view of a joining surface 5 between the first member 1 and the second member 2 that constitute the joining structure 10 of the present embodiment, in a state in which the first member 1 and the second member 2 have been separated from each other at a joining interface position 4.

The first resin and the second resin are not limited to any specific resin composition or resin structure, as long as the second resin has, as a physical property, a higher foaming ratio than the first resin, as mentioned above. The first resin may be a non-foamed resin represented by a resin with a foaming ratio of 1×.

Examples of the first resin and the second resin include thermoplastic resins, such as polyethylene resin, polypropylene resin, polycarbonate resin, polyethylene terephthalate resin, polybutylene terephthalate resin, polyamide resin, polyphenylene sulfide resin, polystyrene resin, polyvinyl chloride resin, polyvinyl acetate resin, polytetrafluoroethylene resin, acrylic resin, etc.

In one embodiment as an example of the combination of the first member 1 and the second member 2, the first resin constituting the first member 1 is a non-foamed resin, and the second resin constituting the second member 2 is a foamed resin. In another example of the combination of the first member 1 and the second member 2, the first resin constituting the first member 1 is a foamed resin, and the second resin constituting the second member 2 is a foamed resin having a higher foaming ratio than the first resin.

Note that the non-foamed resins include, in addition to resins having a foaming ratio of 1×, resins whose bubbles or voids that are uniformly or non-uniformly dispersed therein cannot be perceived with an optical microscope (e.g., at 10×).

Although the second resin, which is a foamed resin, may have any density, the density of the second resin is preferably 0.3 g/cm$^3$ or higher and 0.9 g/cm$^3$ or lower, more preferably 0.3 g/cm³ or higher and 0.6 g/cm³ or lower, and further more preferably 0.35 g/cm³ or higher and 0.55 g/cm³ or lower.

The bubble number density of the second resin, which is a foamed resin, is not particularly limited. However, from the viewpoint of further reliably preventing anisotropy of mechanical properties, the lower limit of the bubble number density is preferably set to 800 bubbles/mm³ or higher, and more preferably 1000 bubbles/mm³ or higher. On the other hand, from the viewpoint of achieving an excellent mechanical strength, the upper limit of the bubble number density of the second resin is preferably $10^{10}$ bubbles/mm³ or lower.

On the other hand, in the case where the first resin is a non-foamed resin, although the density of the first resin is not particularly limited, the density of the first resin is preferably 0.85 g/cm³ or higher and 0.95 g/cm³ or lower, and more preferably 0.90 g/cm³ or higher and 0.91 g/cm³ or lower.

Furthermore, in one embodiment, among the first resin and the second resin constituting the first member 1 and the second member 2, the second member 2 may have a lower melting point than the first resin constituting the first member 1.

In one embodiment, among the first resin and the second resin constituting the first member 1 and the second member 2, the second member 2 may have a lower density than the first resin constituting the first member 1.

The joining of the first member 1 to the second member 2 is not particularly limited in terms of the parts to be joined, the shapes of the parts, or sites of the parts.

FIGS. 1 to 3 described above exemplify the first member 1 and the second member 2 as sheet-shaped members, for the sake of convenience. However, the first member 1 and the second member 2 are not limited to the example illustrated in FIGS. 1 to 3. For example, the first and second members may be block-like masses or may have complicated shapes, respectively. The thickness of the second member 2 in the vicinity of a joining portion is not limited as long as the thickness allows a projection of a welding horn (to be described later) to penetrate the second member and reach the interior of the first member.

The joining structure 10 illustrated in FIGS. 1 to 3 includes the recessed joining portion 3 that has a circular shape when viewed in plan view, as an example. Here, the shape of the recessed joining portion 3 in plan view is not particularly limited and may be any shape, such as a rectangular shape or an oval shape. Among them, the circular shape is preferable as the shape of the recessed joining portion 3, from the viewpoint of increasing a mechanical strength of a portion of the joining structure 10 at which the first member 1 and the second member 2 are joined to each other. Moreover, the vertical cross-sectional shape of the recessed joining portion 3 (shape illustrated in FIG. 2) is not particularly limited.

The diameter, length, and number of the recessed joining portion(s) 3 are also not particularly limited, and are adjusted as appropriate in consideration of the required mechanical strength and aesthetics.

FIG. 3 illustrates a joining surface 5 between the first member 1 and the second member 2 constituting the joining structure 10 illustrated in FIGS. 1 and 2, in a state in which the first member 1 and the second member 2 have been separated from each other at a joining interface position 4. Here, as illustrated in FIG. 3, the joining surface 5 preferably has a hot-molten portion 6 that spreads outward in a ring shape from the recessed joining portion 3.

The presence of the hot-molten portion 6 described above means that in a state where the first member 1 and the second member 2 are joined to each other, the second resin constituting the second member 2 and the first resin constituting the first member 1 are molten and flow at the joining interface position 4 between the first member 1 and the second member 2. The hot-molten portion 6 thus formed makes the first member 1 and the second member 2 have a higher joining strength.

The hot-molten portion 6 may have any size, but usually, as the hot-molten portion 6 increases in size, the joining strength between the first member 1 and the second member 2 is enhanced. For this reason, for example, the hot-molten portion 6 has a ring width dimension of preferably 0.5 mm or larger, more preferably 1.0 mm or larger, and further more preferably 1.5 mm or larger. In particular, making the hot-molten portion 6 have a ring width dimension of 1.5 mm or larger allows the first member 1 and the second member 2 to be joined with a higher joining strength. On the other hand, the ring width dimension of the hot-molten portion 6 may be 0.5 mm or less.

As will be described later, the recessed joining portion 3 is not limited to one having the shape of a perfect circle in plan view. Likewise, the hot-molten portion 6 is not limited to one having the shape of a perfect circular ring in plan view. If the hot-molten portion 6 does not have a perfect circular ring shape in plan view, the ring width dimension of the hot-molten portion 6 can be calculated in the following manner. The area enclosed by the outer contour line of the hot-molten portion 6 is measured, the diameter of a perfect circle that has the same area as the measured area is then calculated, and a difference between the diameter of the perfect circle and the diameter of the recessed joining portion 3 is determined as the ring width dimension of the hot-molten portion 6.

The joining structure 10 described above can be used for various plastic parts and products. For example, it can be used for automobiles, motorcycles, bicycles, daily necessities, electrical appliances, personal computers, cameras, toys, various sheaths, and various containers. In particular, the joining structure 10 can be used for wire harness sheaths for automobiles, for example. Specifically, such a sheathed wire harness includes a wire harness and a wire harness sheath including the joining structure 10 described above. Here, examples of the wire harness sheath include a sheath that externally surrounds the entirety or a part of a wire harness, a sheath that is provided along a part of the outer periphery of a wire harness to protect the wire harness, and a sheath that regulates a direction in which a wire harness extends.

2 Method of Producing Joining Structure

In the following, the joining structure of the present embodiment will be described with reference to the drawings. FIG. 4A to FIG. 4E are schematic diagrams for explaining a method of producing the joining structure of the present embodiment.

Figure 4A:
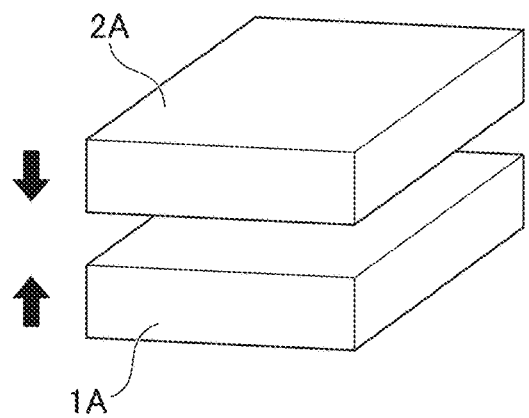
FIG. 4A to FIG. 4E are schematic diagrams for explaining a method of producing the joining structure of the embodiment.
Figure 4B:
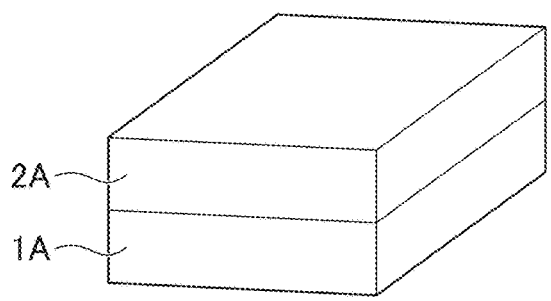
Figure 4C:
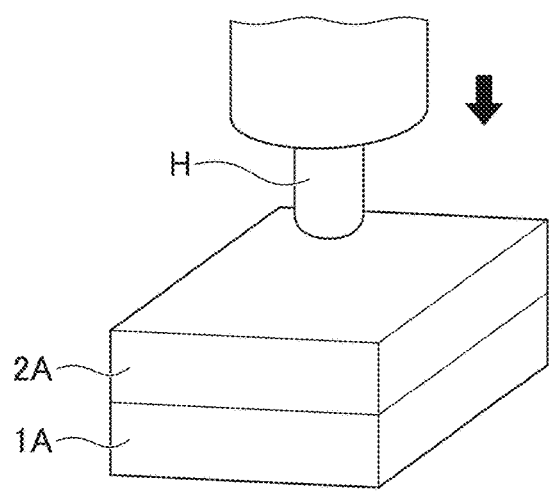
Figure 4D:
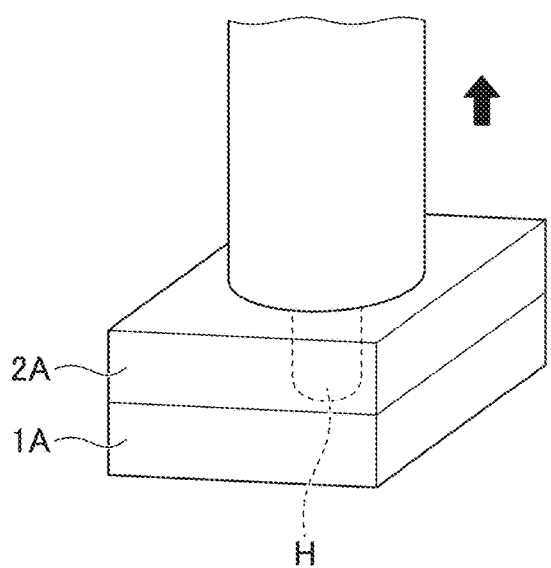
Figure 4E:
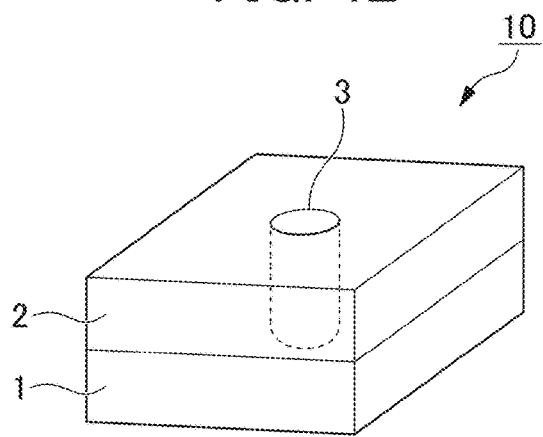

The method of producing the joining structure of the present embodiment includes: a step of overlapping a first member 1A constituted by a first resin and a second member 2A constituted by a second resin on each other, the second resin having, as a physical property thereof, a higher foaming ratio than the first resin (FIG. 4A to FIG. 4B); a step of joining the first member 1 and the second member 2 to each other by forming a recessed joining portion 3, which is formed by pressing and hot-melting the second member 2A such that the resultant molten portion extends from an outer surface of the second member 2A and reaches at least an interior of the first member 1A (FIG. 4C to FIG. 4E).

The method of pressing and hot-melting is not particularly limited as long as the first member 1A and the second member 2A are pressed while being molten by application of heat. For example, pressing and hot-melting of the second member 2A may be performed under an applied pressure by using a soldering iron or a hot plate. Preferably, the pressing and hot-melting of the second member 2A is performed using ultrasonic vibration and an applied pressure according to an ultrasonic welding method. Specifically, the ultrasonic welding method is preferably performed by using a welding horn H having a projection at its tip such that the projection is thrust against the outer surface of the second member 2A.

In this way, the second member 2A, which is constituted by a second resin having, as a physical property, a higher foaming ratio than the first member 1A, is subjected to the pressing and hot-melting so that the resultant molten portion extends from the outer surface of the second member 2A and reaches at least the interior of the first member 1A, thereby forming the recessed joining portion 3. As a result, the second resin constituting the second member 2A and the first resin constituting the first member 1A are molten and flows in a direction of the joining interface between the first and second members. At this time, it is preferable that the welding horn H is thrusted to cross the joining interface position 4 to reach the first member 1A, whereby at least first resin constituting the first member 1A flows to the joining interface position 4 between the first member 1 and the second member 2, while mixing with the second resin constituting the second member 2A. This flow of the first and second resins allows strong joining to be achieved at this stage.

Employing the method of producing the joining structure 10 as described above makes it possible to obtain the joining structure 10 firmly joining the first member 1A and the second member 2A to each other, without having to form a mating structure having a complicated shape or to use an adhesive or a double-sided tape. Moreover, since the joining structure 10 eliminates the need for forming a complicated structure such as a mating structure for joining, the joining portion can be made thinner.

Note that the present invention is not limited to the embodiments described above, and modifications can be made freely without deviating from the spirit of the present invention.

EXAMPLES

Example 1

Figure 5:
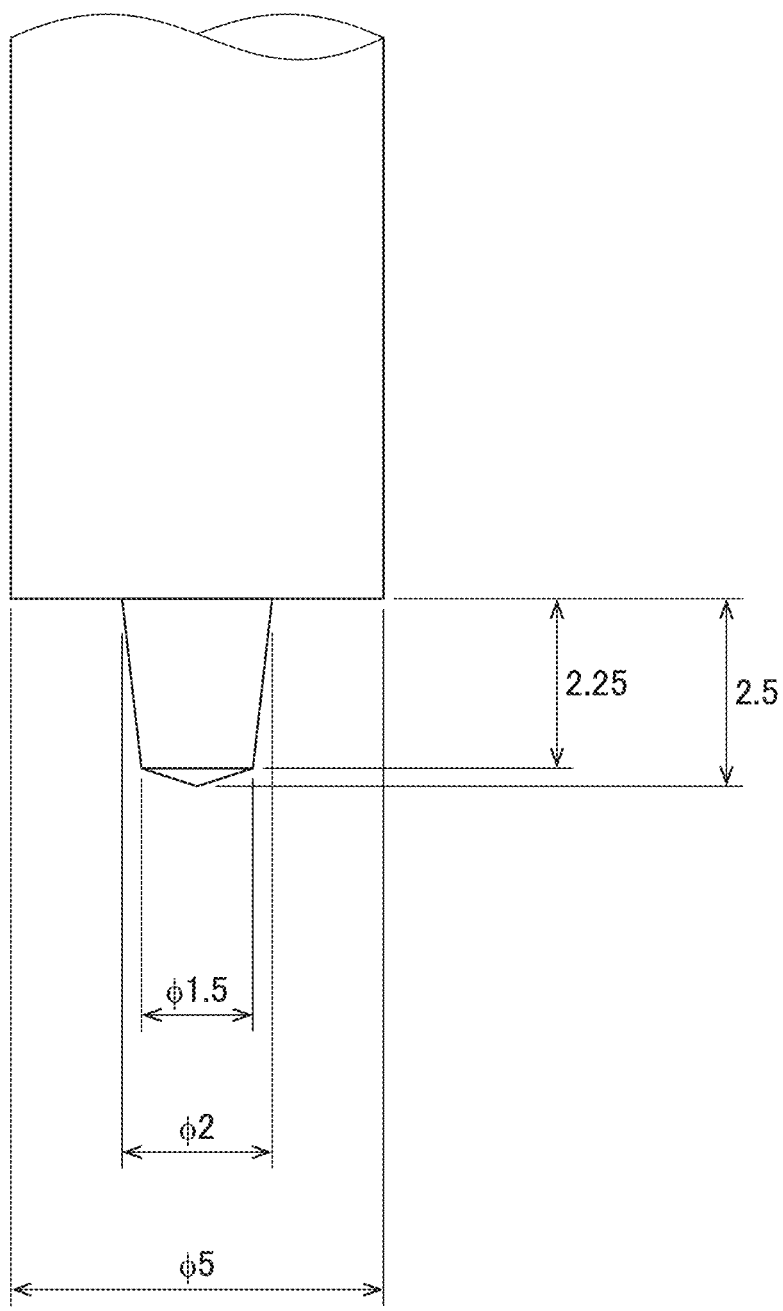
FIG. 5 is a diagram illustrating dimensions of a tip of a welding horn used in Examples.

A plate-shaped member (with a thickness of 1.5 mm) constituted by a non-foamed polypropylene resin (with a density of 0.91 g/cm$^3$) was provided as a first member. A plate-shaped member (with a thickness of 1.5 mm) constituted by a foamed polypropylene resin (with a density of 0.48 g/cm$^3$) was provided as a second member. The first and second members were layered on each other. Using an ultrasonic welding device (Small Welder manufactured by Ultrasonic Engineering Co., Ltd.) equipped with a welding horn with a tip having the shape illustrated in FIG. 5, the second member 2 was pressed and hot-molted so that the resultant molten portion extended from the outer surface of the second member 2, crossed the joining interface position, and reached the interior of the first member. As a result, a recessed joining portion having a shape corresponding to the tip of the welding horn was formed, and the first member and second member were welded to each other, thereby obtaining a joining structure sample.

Comparative Example 1

A joining structure sample was obtained by welding a first member and a second member to each other in the same manner as in Example 1, except that a plate-shaped member (with a thickness of 1.5 mm) constituted by a foamed polypropylene resin (with a density of 0.48 g/cm$^3$) was used as the first member and a plate-shaped member (with a thickness of 1.5 mm) constituted by non-foamed polypropylene resin (with a density of 0.91 g/cm$^3$) was used as the second member.

Comparative Example 2

A joining structure sample was obtained by welding a first member and a second member to each other in the same manner as in Example 1, except that a plate-shaped member (with a thickness of 1.5 mm) constituted by a foamed polypropylene resin (with a density of 0.48 g/cm$^3$) was used as the first member and a plate-shaped member (with a thickness of 1.5 mm) constituted by foamed polypropylene resin (with a density of 0.48 g/cm$^3$) was used as the second member.

Reference Example 1

A joining structure sample was obtained by welding a first member and a second member to each other in the same manner as in Example 1, except that a plate-shaped member (with a thickness of 1.5 mm) constituted by a non-foamed polypropylene resin (with a density of 0.91 g/cm$^3$) was used as the first member and a plate-shaped member (with a thickness of 1.5 mm) constituted by non-foamed polypropylene resin (with a density of 0.91 g/cm$^3$) was used as the second member.

For each of Example 1, Comparative Examples 1 and 2, and Reference Example 1, five joining structure samples were produced. Each sample was set to a tensile tester, and a maximum load at the time of pulling and peeling off the joining portion in a direction perpendicular to the joining surface was measured, thereby determining the joining strength between the first member and the second member. FIG. 6 is a distribution chart of the joining strengths of the joining structure samples of Example 1, Comparative Examples 1 and 2, and Reference Example 1. The results show that the joining structure sample of Example 1, in which the second resin has, as physical properties, a higher foaming ratio and a higher tendency to be hot-molten than the first resin, is superior in joining strength to the joining structure sample of Comparative Example 1, in which the first resin has, as a physical property, a higher foaming ratio than the second resin, and to the joining structure sample of Comparative Example 2, in which the first resin and the second resin are the same foamed resin.

Figure 7A:
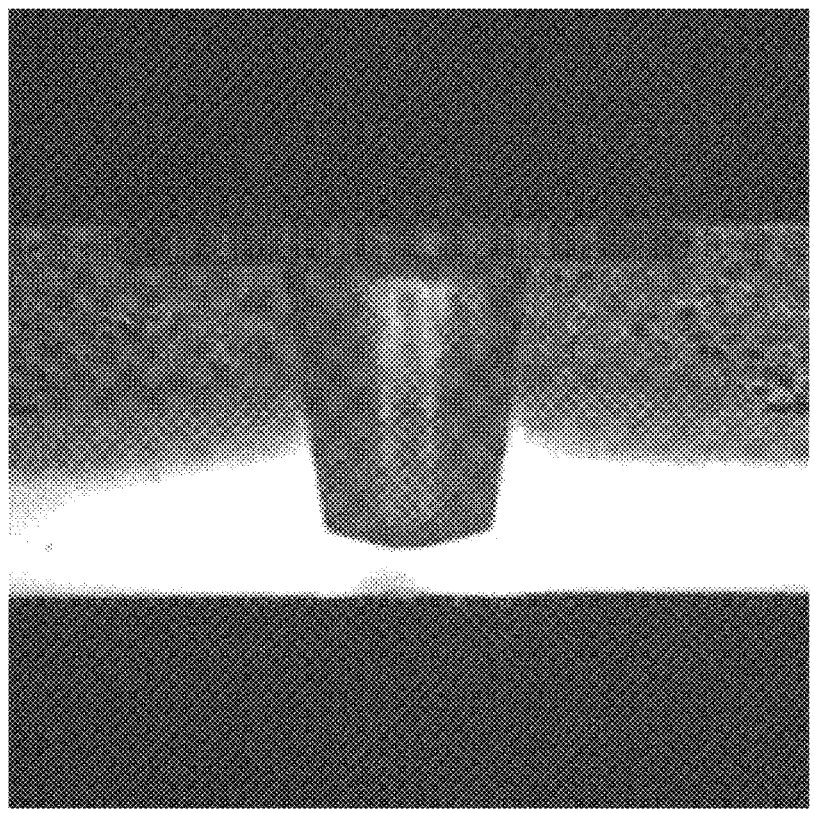
FIG. 7A is an optical micrograph of a vertical cross section of the joining structure sample of Example 1 including a recessed joining portion.
Figure 7B:
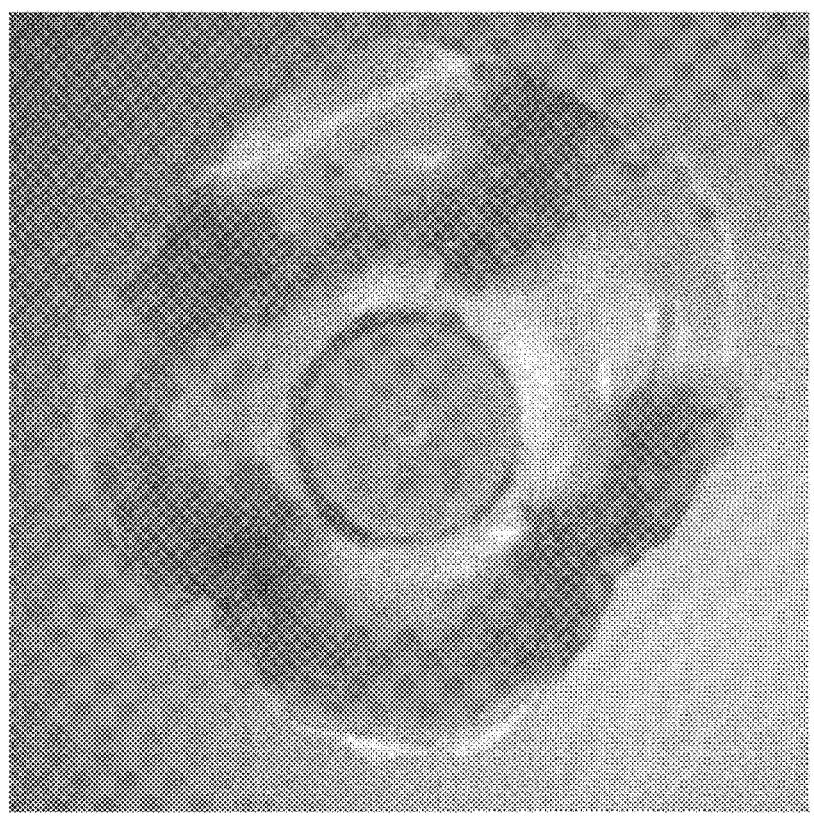
FIG. 7B is an optical micrograph of a joining surface of a first member after separation of the first and second members constituting the joining structure sample of Example 1 from each other at a joining interface position.
Figure 8A:
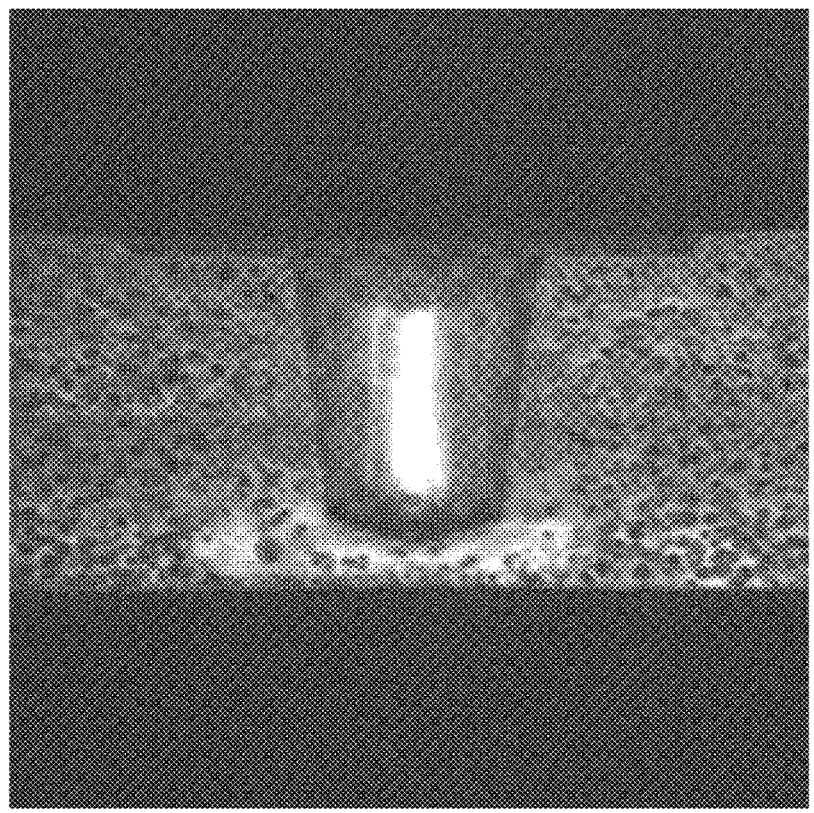
FIG. 8A is an optical micrograph of a vertical cross section of the joining structure sample of Comparative Example 2 including a recessed joining portion.
Figure 8B:
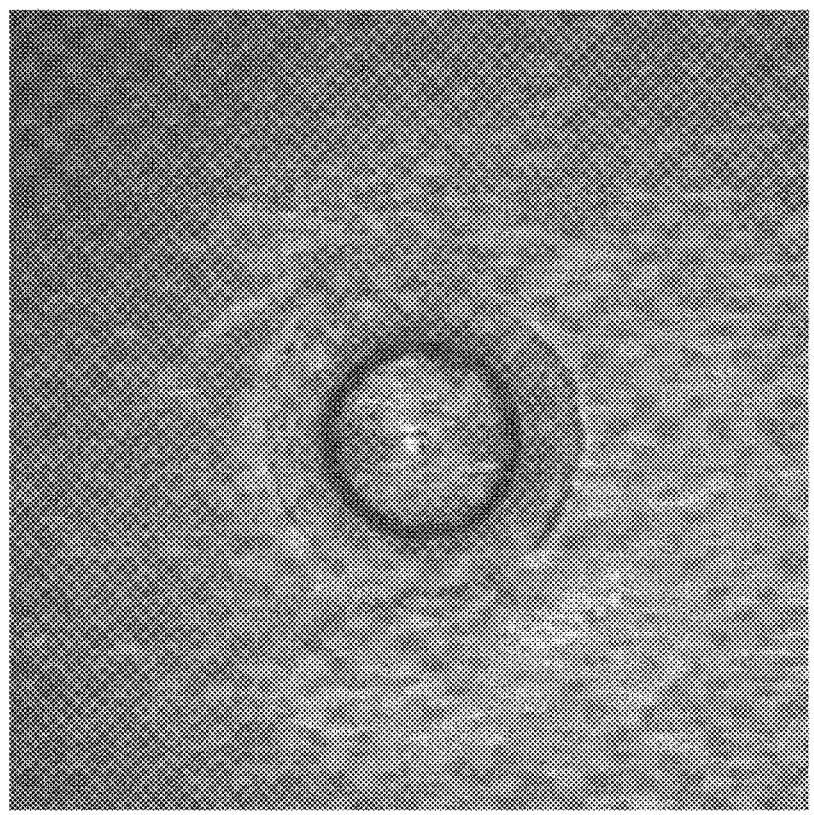
FIG. 8B is an optical micrograph of a joining surface of a first member after separation of the first and second members constituting the joining structure sample of Comparative Example 2 from each other at a joining interface position.

For the joining structure sample of Example 1 and that of Comparative Example 2, a vertical cross section including the recessed joining portion and the joining surface of the first member separated from the second member at the joining interface position were observed with an optical microscope. FIG. 7A is an optical micrograph of the vertical cross section of the joining structure sample of Example 1 including the recessed joining portion. FIG. 7B is an optical micrograph of the joining surface of the first member after separation of the first and second members constituting the joining structure sample of Example 1 from each other at the joining interface position. FIG. 8A is an optical micrograph of the vertical cross section of the joining structure sample of Comparative Example 2 including the recessed joining portion. FIG. 8B is an optical micrograph of the joining surface of the first member after separation of the first and second members constituting the joining structure sample of Comparative Example 2 from each other at the joining interface position. A comparison between FIG. 7B and FIG. 8B shows that the joining structure sample of Example 1, in which the second resin has, as a physical property, a higher foaming ratio than the first resin, has a larger hot-molten portion than the joining structure sample of Comparative Example 2, in which the first and second resins are the same foamed resin.

EXPLANATION OF REFERENCE NUMERALS

10: Joining structure
1, 1A: First member
2, 2A: Second member
3: Recessed joining portion
4: Joining interface position
5: Joining surface
6: Hot-molten portion

The invention claimed is:
1. A joining structure, comprising:
a first member comprising a first resin; and
a second member comprising a second resin,
wherein the first member and the second member is joined to each other,
the second resin has a higher foaming ratio than the first resin,
the joining structure has a recessed joining portion that extends from an outer surface of the second member and reaches at least an interior of the first member in a state in which the first member and second member are overlapped on each other,
a joining surface between the first member and the second member has a hot-molten portion spreading outward in a ring shape, and
the hot-molten portion has a ring width dimension of 0.5 mm or larger.
2. The joining structure according to claim 1, wherein the second resin is a foamed resin, and
the first resin is non-foamed resin.
3. The joining structure according to claim 2, wherein:
the first resin has a density of 0.85 g/cm$^3$ or higher and 0.95 g/cm$^3$ or lower.
4. The joining structure according to claim 2, wherein:
the second resin has a density of 0.3 g/cm$^3$ or higher and 0.9 g/cm$^3$ or lower.
5. The joining structure according to claim 2, wherein:
the second resin has a bubble number density of 800 bubbles/mm$^3$ or higher, and $10^{10}$ bubbles/mm$^3$ or lower.
6. The joining structure according to claim 1, wherein the second resin comprises a material having a lower melting point than the first resin.
7. The joining structure according to claim 1, wherein the second resin comprises a material having a lower density than the first resin.
8. A wire harness sheath comprising:
the joining structure according to claim 1.
9. A sheathed wire harness comprising:
a wire harness; and
the wire harness sheath according to claim 7, wherein
the wire harness sheath protects the wire harness by externally surrounding the wire harness or by being provided along a part of an outer periphery of the wire harness.
10. The joining structure according to claim 1, wherein:
the ring width dimension is 1.0 mm or larger.
11. A joining method, comprising:
overlapping a first member comprising a first resin and a second member comprising a second resin on each other, the second resin having a higher foaming ratio than the first resin; and
joining the first member and the second member to each other by forming a recessed joining portion, the recessed joining portion being formed by pressing and hot-melting the second member such that a resultant molten portion extends from an outer surface of the second member and reaches at least an interior of the first member,
wherein a joining surface between the first member and the second member has the resultant hot-molten portion spreading outward in a ring shape, and
the resultant hot-molten portion has a ring width dimension of 0.5 mm or larger.
12. The joining method according to claim 11, wherein the pressing and hot-melting the second member is performed using ultrasonic vibration and an applied pressure according to an ultrasonic welding method.
13. The joining method according to claim 12, wherein the ultrasonic welding method is performed using a welding horn having a projection at a tip thereof such that the projection is thrusted against the outer surface of the second member.
14. The joining method according to claim 11, wherein:
the second resin comprises a material having a lower melting point than the first resin.
15. The joining method according to claim 11, wherein:
the second resin comprises a material having a lower density than the first resin.
16. The joining method according to claim 11, wherein:
the second resin is a foamed resin, and
the first resin is non-foamed resin.
17. The joining method according to claim 16, wherein:
the first resin has a density of 0.85 g/cm$^3$ or higher and 0.95 g/cm$^3$ or lower.
18. The joining method according to claim 16, wherein:
the second resin has a density of 0.3 g/cm$^3$ or higher and 0.9 g/cm$^3$ or lower.
19. The joining method according to claim 16, wherein:
the second resin has a bubble number density of 800 bubbles/mm$^3$ or higher, and $10^{10}$ bubbles/mm$^3$ or lower.
20. The joining method according to claim 11, wherein:
the ring width dimension is 1.0 mm or larger.

* * * * *